Figures 1, 2:
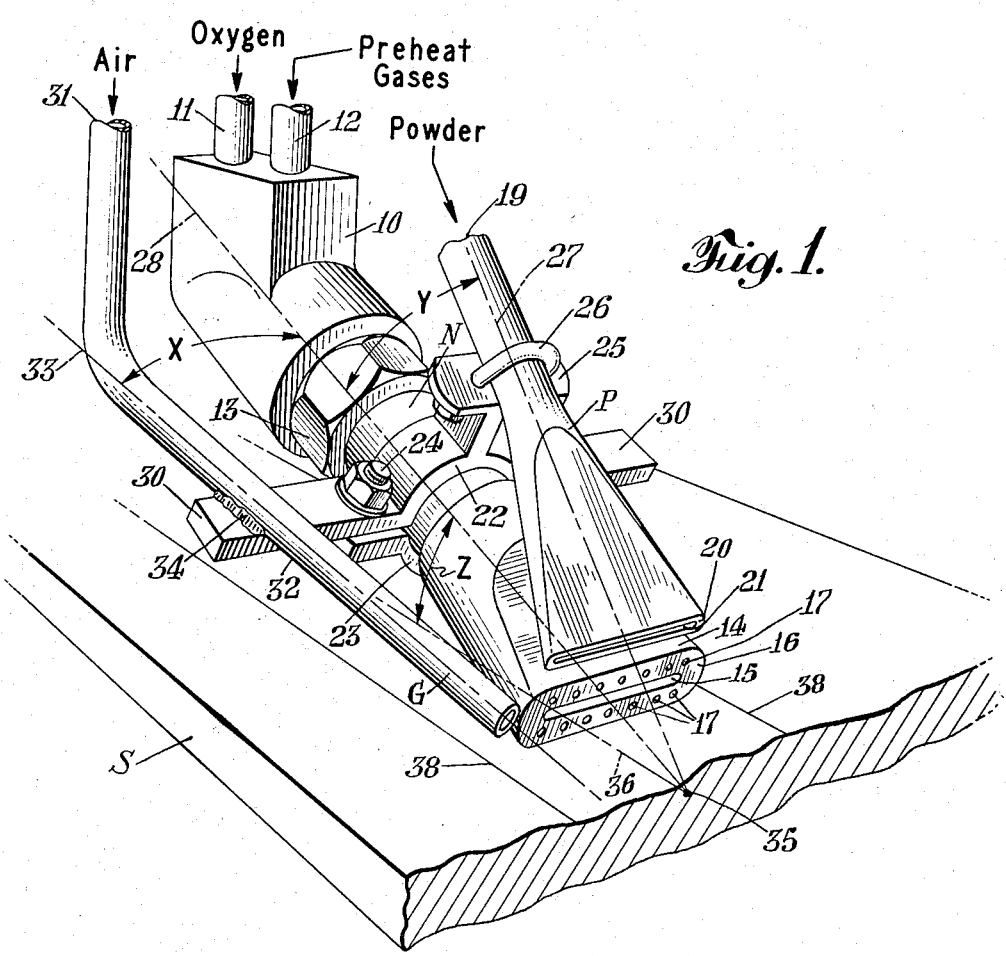

Dec. 29, 1953  R. S. BABCOCK ET AL  2,664,368
EXTERNAL POWDER FEED SCARFING PROCESS AND APPARATUS
Filed June 6, 1951

INVENTORS
ROGER S. BABCOCK
EDWARD M. HOLUB
BY D.C.Harrison
ATTORNEY

Patented Dec. 29, 1953

2,664,368

UNITED STATES PATENT OFFICE 2,664,368

EXTERNAL POWDER FEED SCARFING PROCESS AND APPARATUS

Roger S. Babcock, Plainfield, and Edward M. Holub, Elizabeth, N. J., assignors to Union Carbide and Carbon Corporation, a corporation of New York Application June 6, 1951, Serial No. 230,137

2 Claims. (Cl. 148—9.5)

This invention relates to a process of and apparatus for thermochemically removing surface metal in wide shallow paths from oxidation resistant metals by a sheetlike oxygen stream assisted by preheat flames and combustible metal powder supplied externally to the oxygen stream. More particularly the invention relates to process of and apparatus for controlling the character of such composite scarfing stream to provide improved surface conditions in the regions of the surface metal along the intersection of successive parallel scarfing passes.

It has been proposed to remove a layer of surface metal or scarf stainless steel bodies with a ribbon-like oxygen jet assisted by preheat flames and an externally fed ribbonlike stream of adjuvant combustible metal powder, and a process of and apparatus for accomplishing this by hand manipulation in accordance with U. S. patent application Ser. No. 187,386, filed September 28, 1950, by E. M. Holub, D. T. Kelley, and R. O. Wyland, Jr., has produced commercially acceptable products. Attempts, however, to adapt such process and apparatus to multiple pass machine operation for the economical scarfing of wider and longer areas by making successive slightly overlapping pass cuts have not produced acceptable results.

For machine scarfing the blowpipe apparatus provides a wider scarfing jet to make cuts 3 inches or more wide, the blowpipe is moved relatively to the metal surface at a uniform rate from one end to the other of the surface and at a substantially uniform height above the surface, and all the variables of nozzle inclination and orientation must be held constant. It is also practically essential that the surface of the work be substantially horizontal in machine operation. The machine operation inherently lacks the flexibility of the hand manipulation in which the operator has constant control of variations in the dihedral angle between the ribbonlike scarfing jet and the work surface and in the degree of lateral side sweep of the scarfing jet toward the edge of the scarfing groove or pass away from a previously made pass.

Thus it was found that when parallel scarfing cuts were made by machine on stainless steel slabs to remove a thin surface layer of metal with a blowpipe assemblage similar to that described in the aforementioned patent application, but with wider outlet orifices to makes passes over 3 inches wide, an unsatisfactory condition resulted along the pass intersections. Particularly it was found that a small overlap of the passes is essential in order to insure the removal of all defective surface metal but even with such overlap, the resulting pass intersection had scalloped out depressions and also deposits of tightly adherent metal of such character that the work piece when rolled into a product, contained defects termed shadows and shiners. This undesirable result could not be eliminated by various changes including changes: in the preheat flames; in the relative angles between the oxygen nozzle and work surface, and between the oxygen and powder feed nozzles; in the pressures, flow characteristics, and velocities of the oxygen and powder jets; and in the speed of advance. Changes in the relative widths of the powder jet and oxygen jet likewise failed to successfully solve the problem.

According to the present invention it has been discovered that the problem can be completely successfully solved by weakening the edge portion of the scarfing jet with a diluting and cooling gas stream.

Principal objects of the present invention are to provide a method of and aparatus for preventing the formation of conditions along the pass intersections made by machine powder scarfing of oxidation resistant metals that result in commercially undesirable surfaces in products made from the scarfed metals; and to provide an improved method and apparatus for powder scarfing in which the scarfing reaction is stable and not subject to loss of cut when the angles, orientation of blowpipe, speed of advance and other important factors are maintained constant irrespective of the condition of the work piece, and in which one or both edges of the scarfing stream are changed to eliminate the effect of such portions that would produce undesired surface formations along the edges of the scarfed pass.

These and other objects and novel features of the invention will become apparent from the following description having reference to the annexed drawing in which:

Fig. 1 is a perspective view of an exemplary blowpipe assemblage for carrying out the process of the invention, and Fig. 2 is a view of a cross-section of a stainless steel slab after it has been scarfed according to the present invention to illustrate the contour of the new surface produced, particularly the rounded and almost completely flat intersections between passes.

The process, according to the present invention, comprises the scarfing of oxidation resistant metal such as stainless steel in successive slightly overlapping passes by impinging obliquely against the surface metal a thin wide stream of high purity oxygen assisted by preheat flames and by an adjuvant combustible metal powder, such powder being preferably introduced externally in a thin wide stream, the oxygen and powder streams being of substantially the same width, and also externally feeding to at least one of the edges of the composite ribbonlike scarfing stream formed by the oxygen and powder streams, a relatively smaller stream or streams of a diluting and cooling gas to weaken and eliminate the reactivity of such of the edge portion or portions of the composite scarfing stream that would otherwise cause the undesired formations along the pass intersections. Such auxiliary gas stream or streams may comprise air, nitrogen, argon, or other gas of low oxidation reactivity, or mixtures thereof, and is preferably projected as a compact, smooth-flowing stream substantially in the plane of the ribbonlike scarfing stream and laterally toward the edge of the scarfing stream. The relative velocities and angles of orientation of the several streams are maintained constant within limits hereinafter specified and the entire composite of streams is advanced at a uniform rate with respect to the work surface in the general direction of flow of the scarfing stream.

The width of pass cut by the scarfing stream is slightly reduced by the addition of the auxiliary stream, showing the effect of dilution of the edge portion of the oxygen stream but there results a pass intersection which is nicely rounded, free of sharp edged depressions and free of tightly adherent metallic deposits, the slag breaking off clean. A stainless steel body so conditioned can be rolled into flawless products.

The unexpected improvement obtained is indicated by the following example of machine scarfing without an auxiliary air jet and with an auxiliary air jet according to the invention. A slab of stainless steel was positioned horizontally below the cross-bridge of a gantry type of desurfacing machine having a cross-carriage mounted for crosswise adjustment on the bridge, the bridge being mounted at each end on carriages travelling on tracks running lengthwise of the long dimension of the slab. The bridge carriages move the bridge and cross-carriage thereon at scarfing speed. A blowpipe holder is mounted on the cross-carriage for vertical adjustment. Such mechanism provides the necessary transverse adjustment for the blowpipe and the longitudinal advancement of the blowpipe at scarfing speed, and the structure may be similar to that shown and described in U. S. Patent 2,223,451. The blowpipe assembly, providing a ribbonlike oxygen stream and external feed powder stream, was similar to that shown in the aforementioned application Ser. No. 187,386, but was constructed to provide a composite scarfing stream making a pass cut 3½ inches wide. This assembly was mounted on the blowpipe holder to provide a dihedral angle Z between the work surface and the oxygen stream of 40° and a dihedral angle Y between the oxygen stream and the powder stream of 35°. The velocities of the gas entrained powder stream and oxygen streams were respectively 150 sec-ft. and 750 sec-ft. The mouth of the oxygen orifice was positioned 2 inches above the work surface and the blowpipe was mounted so that the direction of advance was in the direction of flow of the stream. All these adjustments were maintained constant during the cuts.

A cut was initiated in the usual way by preheating at the initial end of the slab with the preheat flames and when cutting oxygen and powder feeds were turned on, the blowpipe assembly was advanced at uniform speed toward the other end of the slab to make an initial pass cut along the left longitudinal edge of the slab. The blowpipe assembly was then returned to the initial end of the slab, indexed rightward about 3 inches for a second pass cut, and a second cut was made in the same way as the first. This produced a line of intersection between the passes. After cooling the slag deposit, and brushing the slag off the pass areas from which it readily cracked off, it was found that along the pass intersection some slag adhered tightly. After removal of as much of the adherent slag as would come loose by sharply rapping it, it was observed that along the overlapped pass intersection, there was a peculiar scalloped out formation including a series of sharp edged depressions which previous experience indicated would not roll out satisfactorily upon further processing of the slab. Also observed along the pass intersection were irregular deposits of welded-on metallic material. Such deposits could not be economically removed mechanically because of the irregularity of the intersection, i. e., a scraper or chisel would cut them off only from the higher points.

The same apparatus was provided with an auxiliary air jet nozzle on the left side adjacent the previously made pass, which nozzle was positioned to direct the auxiliary air jet inwardly toward the edge of the scarfing stream at an angle X between the respective axes of 10°. The velocity of flow of the auxiliary air was about 400 feet per second. The blowpipe assembly was indexed to right for another pass cut and the reaction initiated at the initial edge of the slab as before, but with the air jet turned on. A pass cut was then made with the air jet added on the side overlapping the previous pass cut. After water cooling, the slag was readily brushed off the pass intersection as well as off the rest of the pass surfaces and the examination of the new pass intersection showed a regular line of intersection, a well rounded contour at the line of intersection, a complete absence of the previously noted scalloping effect and complete absence of welded-on metallic material. Such slab surfaces can be and are being rolled into commercially flawless product.

The demonstrated beneficial effect of the auxiliary air or gas stream is believed due to a weakening of and rendering nonreactive the edge portion of the scarfing stream which causes the undesirable formation along the edge of a pass cut. The edge or fringe portion of the ribbonlike scarfing stream as it necessarily passes through the appreciable distance between the nozzle mouth and the reaction zone on the work surface assumes a turbulent character so that the outer edges of the reaction zone are unstable, the reaction periodically cutting deeper and not so deep to make a scalloped effect. It is also believed that the edge portions of the composite scarfing stream fail to sufficiently burn the powder and thus let the molten particles agglomerate and weld themselves to the metal surface. When the auxiliary air stream is added to the edge of the scarfing stream it is believed that the turbulent edge portion is supported and diluted and probably cooled. The turbulent part is sufficiently diluted so that it no longer supports the reaction and the width of the reaction zone is narrowed. It is known that a relatively small amount of dilution of an oxygen cutting stream has a considerable effect upon its cutting effectiveness. The remaining main part of the scarfing stream is more uniformly streamlined in flow characteristics and produces a uniformly acting reaction puddle on the work surface.

Referring now to Fig. 1 there is illustrated only the nozzle portion of a blowpipe apparatus in position for operating upon a slab S. As hereinbefore mentioned, the mechanism for adjusting the position of and moving the blowpipe assembly may be any suitable device customarily employed for mechanical deseaming and desurfacing and therefore such apparatus is not illustrated as it forms no part of the present invention. The blowpipe assembly includes a head 10 provided with inlets 11 and 12 for cutting oxygen and for preheat flame gases, respectively. Other conduits for supply and withdrawal of cooling water may also be provided as is customary with machine-operated desurfacing apparatus. Such cooling conduits are not illustrated in the interests of clearness. The nozzle head 10 has angularly secured thereto a nozzle N which is coupled by a ring nut 13 to the head 10 and which has an outlet portion 14 containing a central oxygen passage shaped to convert the central cutting oxygen stream from a round cross-section to a wide, thin, ribbonlike cross-section which issues from an orifice mouth 15 in the end face 16 of the portion 14. A row of preheat flame holes 17 is provided in the end face 16, preferably above and below the orifice mouth 15. If desired, a single row of preheat holes could be employed, or the preheat holes could be of slotted form. The preheat holes 17 connect through suitable passages in the nozzle and head with the preheat gas inlet 12.

For feeding adjuvant powder externally to the oxygen stream there is provided above the nozzle N a powder feed nozzle P having a gas-borne powder inlet 19 which changes cross-sectionally in the direction of flow and with a suitable internal contour until it reaches a wide slotted orifice mouth 21 in the mouth end face 20 of the nozzle P located adjacent the end face 16 of the nozzle N. The internal contour of the powder feed passage of the nozzle P may be any contour which will effect substantially uniform flow of powder in a ribbonlike stream from the orifice mouth 21. A suitable contour may be similar to that illustrated in the aforementioned U. S. patent application Ser. No. 187,386.

The nozzles P and N are mounted in rigid relation to each other by suitable means, such as a clamp 22 having its central portion formed to enclose the upper half of the nozzle N. Such clamp portion 22 is held in position by a portion 23 encircling the lower half of the nozzle N and secured by bolts 24 to the upper half portion 22. A bracket 25 is secured to and extends upwardly from the central part of the clamp portion 22, and the nozzle P is secured to such bracket 25 by a U-bolt 26. The bracket 25 and bolt 26 are arranged to hold the nozzle P so that its axis 27 makes an acute angle Y with the axis 28 of the nozzle N, the mouths 15 and 21 being parallel and relatively closely spaced in order that the powder jet may pour into the upper side of the ribbonlike oxygen stream.

The clamp portion 22 is provided with laterally extended ears 30 to provide convenient supports for auxiliary gas or air nozzles G. One such nozzle G is shown and this has an inlet portion 31 at the upstream end of a straight cylindrical portion 32. The portion 32 has a relatively long straight air passage therethrough in order that the air jet produced by the nozzle G shall be compact and substantially streamlined in flow. The axis 33 of the cylindrical portion 32 is positioned substantially in the same plane as the plane containing the axis 28 of the nozzle N and the long axis of the orifice mouth 15. The axis 33 of the nozzle portion 32 should preferably make an acute angle X with the main axis 28 of the nozzle N. The nozzle G is suitably secured to one ear 30 as by brazing as indicated at 34. If desired, an air nozzle similar to nozzle G may be secured to the opposite ear 30 to provide an auxiliary air jet for the other edge of the scarfing stream.

The nozzle assembly is mounted on the blowpipe holder of a machine so that the axis 28 of the nozzle N makes an angle Z with the axis of the work piece. The values of these angles of orientation are as follows: The angle Z may be 30 to 50° but is preferably about 40°. The angle Y may be between 25 and 40° and excellent results are obtained if the value of this angle is about 35°. The angle X can be varied between 5 and 30° and it is found that excellent results are obtained at an angle of about 10°. The auxiliary stream and oxygen stream meet at a distance upstream from the point of impingement of the scarfing stream on the work surface. Preferably the meeting of the streams is not above the point of impingement of the powder stream into the oxygen stream.

In Fig. 1 the nozzle assembly is shown in a position as it would be when making a second pass cut along the surface of the slab S after having made a first pass cut along the left edge of the slab. The cutting oxygen stream and the powder streams flow toward the point of intersection between the axis 27 of the nozzle P and the axis 28 of the nozzle N which point of intersection 35 is a considerable distance above the surface of the slab S. The angle Z is indicated between the axis 28 and a broken line 36 passing through the junction point 35 and which is parallel to but above the surface of the slab S. Thus, the point of impingement of the scarfing stream against the work surface would be considerably ahead of the nozzles and is not shown in the drawing. The nozzle assembly is advanced in a direction parallel to the broken line 36.

In Fig. 2 there is illustrated the contour of the surface of the slab after its surface has been removed in four passes A, B, C and D. The pass intersections are indicated at 38 but these have been exaggerated for purposes of illustration. The intersection lines are well rounded.

With the process and apparatus according to this invention, it is now possible to economically machine scarf stainless steel slabs in a series of multiple wide passes without producing undesirable formations and deposits along the pass intersections and to produce machine desurfaced stainless steel slabs that, after rolling, will be free of shadows and shiners. The adjuvant powder employed may be similar to the materials disclosed by U. S. Patent 2,451,422 and the gas employed to carry the powder may be air, oxygen, or any other suitable gas.

It is contemplated that the auxiliary gas stream as described herein may also be used with a hand manipulated blowpipe assembly so that good results may be obtained by a less skilled operator, or that it may be used with a slotted powder scarfing nozzle in which the powder is internally mixed with the scarfing stream, and that various modifications may be made in the process and apparatus disclosed without departing from the spirit and scope of the invention.

We claim:

1. In a scarfing blowpipe assembly comprising the combination of nozzle means having a cutting oxygen passage therethrough terminating in a slotted mouth and shaped to convert a cutting oxygen stream to flow as a wide ribbonlike stream, said nozzle means having preheat flame ports adjacent at least one wide side of said mouth; and adjuvant powder feeding means comprising a wide slotted powder outlet orifice constructed and positioned for feeding a ribbonlike stream of the powder obliquely toward and into the upper side of the oxygen stream at a dihedral angle of between 25 and 40 degrees; said assembly being adapted to advance such composite stream relatively along the work surface in the general direction of the stream thereon; the combination therewith of means defining an auxiliary nozzle orifice constructed and positioned for directing an auxiliary diluting gas stream such as air substantially in the plane of the ribbonlike oxygen stream and into at least one side edge thereof at an angle of between 5 and 30 degrees between the directions of flow of the auxiliary stream and the oxygen stream, said auxiliary stream meeting the scarfing stream prior to impingement of the scarfing stream upon the work surface.

2. In a process for scarfing an oxidation resistant metal body by the application of a wide ribbonlike oxygen stream obliquely against the work surface assisted by preheat flames and by a ribbonlike stream of adjuvant powder material of approximately the same width as the oxygen stream, said powder stream being fed at an acute dihedral angle to the oxygen stream through the preheat flame onto the oxygen stream which then projects the powder toward the work surface at the leading portion of the reaction zone thereon, and the advance of such composite stream relatively along the work surface in the general direction of the stream thereon, the combination therewith of the step of directing at an acute angle and substantially in the plane of said oxygen stream an auxiliary stream of a diluting gas such as air into at least one side edge of the composite stream to eliminate the undesired cutting action of such side edge of the composite stream, in which the angle between the auxiliary stream and scarfing stream directions of flow is between 5 and 30 degrees and said auxiliary stream meets the scarfing stream prior to impingement of the scarfing stream upon the work surface.

ROGER S. BABCOCK.
EDWARD M. HOLUB.

References Cited in the file of this patent

UNITED STATES PATENTS

| Number | Name | Date |
|---|---|---|
| 2,184,561 | Babcock et al. | Dec. 26, 1939 |
| 2,215,577 | Bucknam et al. | Sept. 24, 1940 |
| 2,260,322 | Jones et al. | Oct. 28, 1941 |
| 2,267,405 | Jones et al. | Dec. 23, 1941 |
| 2,365,308 | Sylvester | Dec. 19, 1944 |
| 2,409,654 | Anderson | Oct. 22, 1946 |
| 2,415,815 | Deming | Feb. 18, 1947 |
| 2,451,422 | Wagner | Oct. 12, 1948 |
| 2,487,974 | Kirk | Nov. 15, 1949 |

FOREIGN PATENTS

| Number | Country | Date |
|---|---|---|
| 601,982 | Great Britain | May 18, 1948 |